(12) United States Patent
Frangioso et al.

(10) Patent No.: US 9,207,726 B1
(45) Date of Patent: Dec. 8, 2015

(54) IT DEVICE

(71) Applicant: EMC Corporation, Hopkinton, MA (US)

(72) Inventors: Ralph C. Frangioso, Franklin, MA (US); Robert P. Wierzbicki, Worcester, MA (US); W. Brian Cunningham, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 136 days.

(21) Appl. No.: 14/042,535

(22) Filed: Sep. 30, 2013

(51) Int. Cl.
*G06F 1/16* (2006.01)
*G06F 1/18* (2006.01)

(52) U.S. Cl.
CPC ..................................... *G06F 1/187* (2013.01)

(58) Field of Classification Search
CPC .................................. G06F 1/187; G06F 1/16
USPC ..................................................... 361/679.33
See application file for complete search history.

(56) References Cited

U.S. PATENT DOCUMENTS

| | | | |
|---|---|---|---|
| 2002/0194412 A1* | 12/2002 | Bottom | 710/302 |
| 2012/0147549 A1* | 6/2012 | Wu et al. | 361/679.33 |
| 2012/0176743 A1* | 7/2012 | Gong et al. | 361/679.33 |
| 2012/0275106 A1* | 11/2012 | McGuire, Jr. | 361/679.33 |
| 2012/0293947 A1* | 11/2012 | Chen et al. | 361/679.33 |
| 2013/0229766 A1* | 9/2013 | Williams et al. | 361/679.33 |
| 2013/0242501 A1* | 9/2013 | Chen et al. | 361/679.33 |
| 2013/0342988 A1* | 12/2013 | Peng et al. | 361/679.33 |
| 2015/0016050 A1* | 1/2015 | Chen et al. | 361/679.33 |
| 2015/0043150 A1* | 2/2015 | Liu et al. | 361/679.33 |

* cited by examiner

*Primary Examiner* — Forrest M Phillips
(74) *Attorney, Agent, or Firm* — Brian J. Colandreo; Mark H. Whittenberger; Holland & Knight LLP

(57) ABSTRACT

An IT device includes a system board including at least one microprocessor. At least one 2.5" disk drive is electrically coupled to the system board. At least one 3.5" disk drive is electrically coupled to the system board. An enclosure is configured to house the system board and includes at least one native 2.5" drive bay configured to house the at least one 2.5" disk drive, and at least one native 3.5" drive bay configured to house the at least one 3.5" disk drive.

21 Claims, 3 Drawing Sheets

(front view)

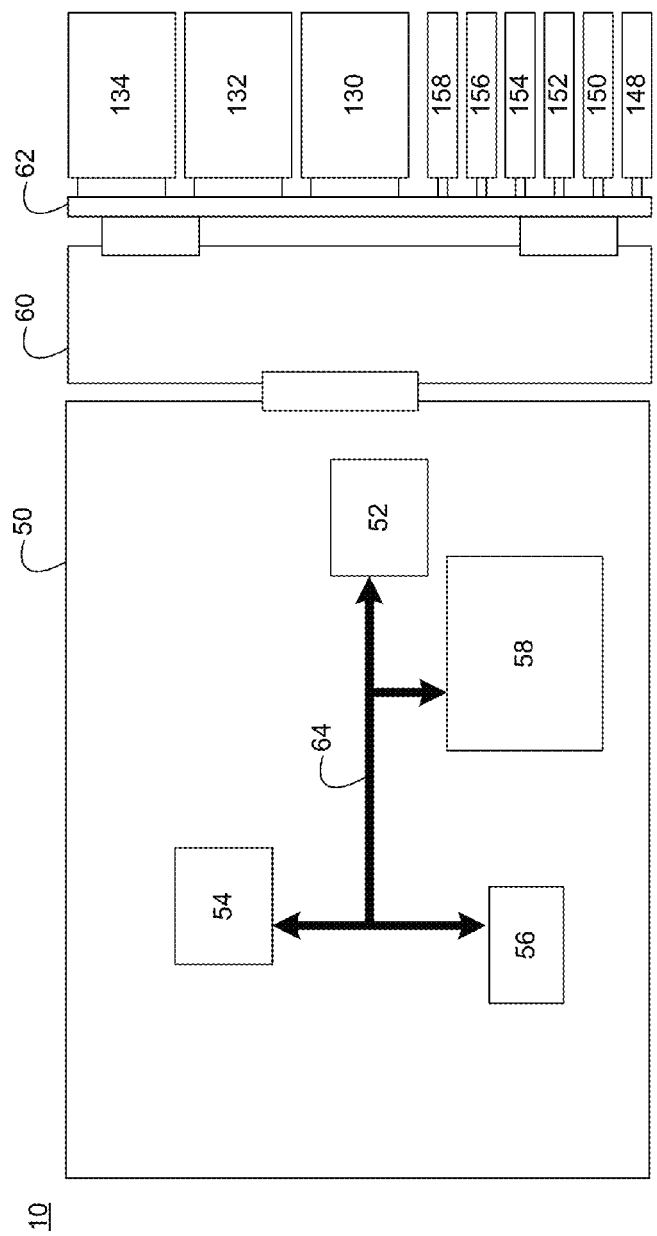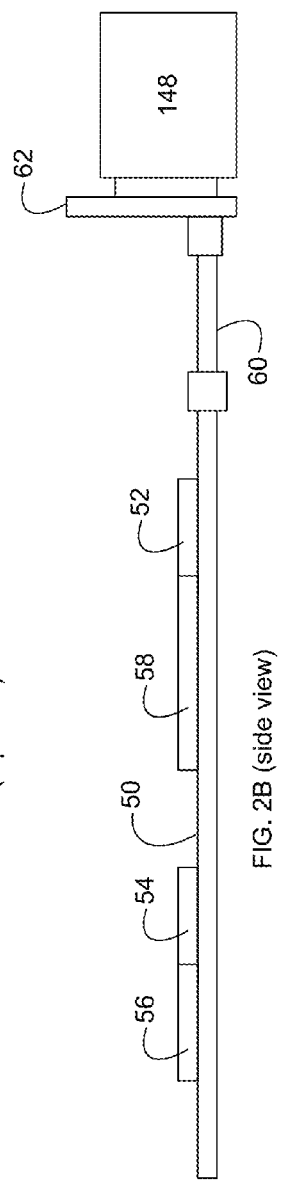
FIG. 2A (top view)
FIG. 2B (side view)

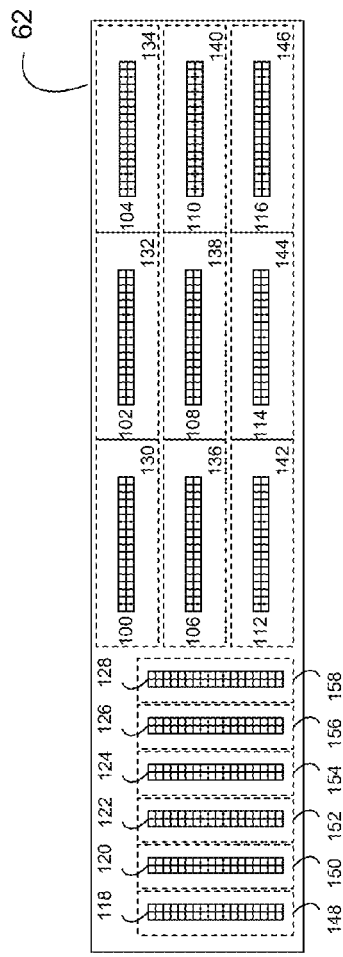
FIG. 2C (front view)
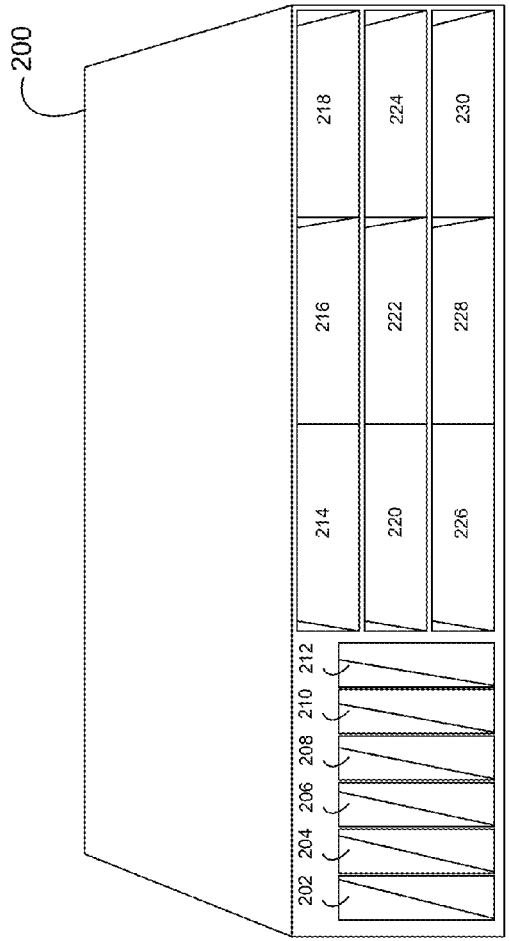
FIG. 3 (perspective view)

IT DEVICE

TECHNICAL FIELD

This disclosure relates to IT devices and, more particularly, to IT devices that are configurable to include multiple types of disk drives.

BACKGROUND

In today's IT infrastructure, high availability is of paramount importance. Specifically, critical (and sometimes non-critical) components within an IT infrastructure are often layered in redundancy. For example, primary servers may be supported by backup servers; primary switches may be supported by backup switches; primary power supplies may be supported by backup power supplies; and primary storage systems may be supported by backup storage systems.

When designing such high availability devices, flexibility concerning the manner in which these devices are configured is highly important. Further, since enclosure space within these devices is at a premium, such configuration flexibility should be accompanied by spatial efficiency.

SUMMARY OF DISCLOSURE

In one implementation, an IT device includes a system board including at least one microprocessor. At least one 2.5" disk drive is electrically coupled to the system board. At least one 3.5" disk drive is electrically coupled to the system board. An enclosure is configured to house the system board and includes at least one native 2.5" drive bay configured to house the at least one 2.5" disk drive, and at least one native 3.5" drive bay configured to house the at least one 3.5" disk drive.

One or more of the following features may be included. The at least one 2.5" disk drive may include at least one PCI Express 2.5" disk drive. The at least one 2.5" disk drive may include at least one solid state, 2.5" disk drive. The at least one 2.5" disk drive may include at least one forward-facing 2.5" disk drive. The at least one forward-facing 2.5" disk drive may include at least one hot-swappable, forward-facing 2.5" disk drive. The at least one 3.5" disk drive may include at least one SATA 3.5" disk drive and/or at least one SAS 3.5" disk drive. The at least one 3.5" disk drive may include at least one electromechanical 3.5" disk drive. The at least one 3.5" disk drive may include at least one forward-facing 3.5" disk drive. The at least one forward-facing 3.5" disk drive may includes at least one hot-swappable, forward-facing 3.5" disk drive. The at least one 2.5" disk drive and the at least one 3.5" disk drive may be configured as a tiered storage system. The IT device may be configured for use in a high availability storage system.

In another implementation, an IT device includes a system board including at least one microprocessor. At least one solid state, PCI Express 2.5" disk drive is electrically coupled to the system board. At least one electromechanical 3.5" disk drive is electrically coupled to the system board. An enclosure is configured to house the system board and includes: at least one native 2.5" drive bay configured to house the at least one solid state, PCI Express 2.5" disk drive, and at least one native 3.5" drive bay configured to house the at least one electromechanical 3.5" disk drive.

One or more of the following features may be included. The at least one solid state, PCI Express 2.5" disk drive may include at least one forward-facing, solid state, PCI Express 2.5" disk drive. The at least one forward-facing, solid state, PCI Express 2.5" disk drive may include at least one hot-swappable, forward-facing, solid state, PCI Express 2.5" disk drive. The at least one electromechanical 3.5" disk drive may include at least one forward-facing, electromechanical 3.5" disk drive. The at least one forward-facing, electromechanical 3.5" disk drive may include at least one hot-swappable, forward-facing, electromechanical 3.5" disk drive. The at least one solid state, PCI Express 2.5" disk drive and the at least one electromechanical 3.5" disk drive may be configured as a tiered storage system. The IT device may be configured for use in a high availability storage system.

In another implementation, an IT device includes a system board including at least one microprocessor. At least one hot-swappable, solid state, PCI Express 2.5" disk drive is electrically coupled to the system board. At least one hot-swappable, electromechanical, 3.5" disk drive is electrically coupled to the system board. An enclosure is configured to house the system board and includes at least one native 2.5" drive bay configured to house the at least one hot-swappable, solid state, PCI Express 2.5" disk drive, and at least one native 3.5" drive bay configured to house the at least one hot-swappable, electromechanical, 3.5" disk drive.

One or more of the following features may be included. The at least one hot-swappable, solid state, PCI Express 2.5" disk drive and the at least one hot-swappable, electromechanical, 3.5" disk drive may be configured as a tiered storage system.

The details of one or more implementations are set forth in the accompanying drawings and the description below. Other features and advantages will become apparent from the description, the drawings, and the claims.

BRIEF DESCRIPTION OF THE DRAWINGS

FIGS. 2A & 2B are diagrammatic views of a system board, drive controller system, and mid-plane assembly included within the IT device of FIG. 1;

FIG. 2C is a diagrammatic view of the mid-plane assembly of FIGS. 2A & 2B; and FIG. 3 is a perspective view of an enclosure for the IT device of FIG. 1.

Like reference symbols in the various drawings indicate like elements.

DETAILED DESCRIPTION OF THE PREFERRED EMBODIMENTS

Figure 1:
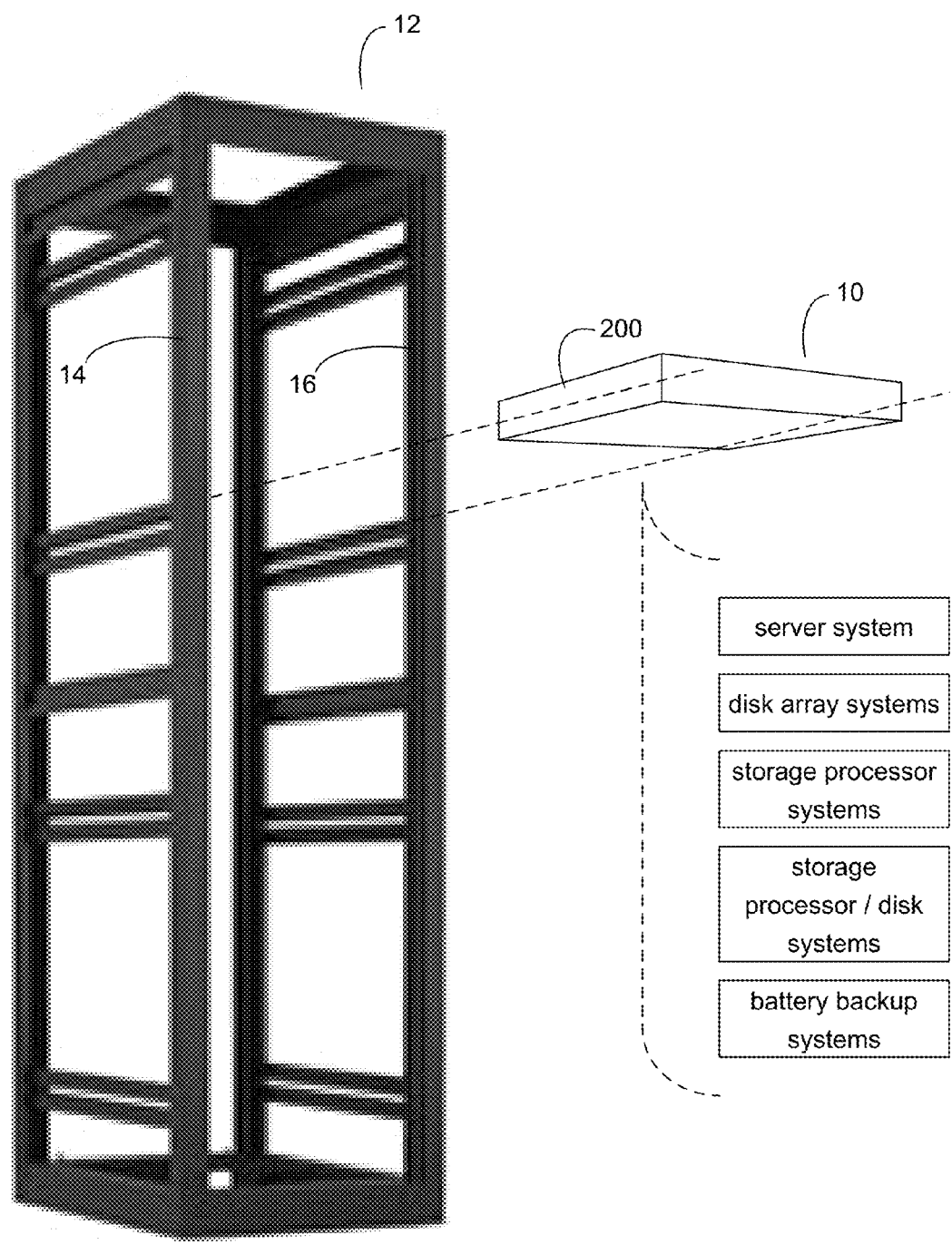
FIG. 1 is a perspective view of an IT rack and an IT device.

Referring to FIG. 1, IT devices (e.g., IT device 10) may be utilized by organizations to process and store data. Examples of IT device 10 may include but are not limited to the various components of high-availability storage systems, such as: server systems, disk array systems, storage processor systems, storage processor/disk systems, and battery backup systems.

IT racks (e.g., IT rack 12) may be utilized to store and organize these IT devices (e.g., IT device 10). For example, IT rack 12 may be placed within a computer room and various IT devices may be attached to rails (e.g., NEMA rails 14, 16) included within IT rack 12, wherein these rails (e.g., NEMA rails 14, 16) may have a standard and defined spacing between them (e.g., 19"). Typically, IT devices that are configured to fit within IT rack 12 may be described as rack-mountable IT devices. Alternatively. IT device 10 may be a free-standing device that does not require an IT rack for mounting.

Referring also to FIGS. 2A, 2B, 2C & FIG. 3, positioned within IT device 10 may be one or more system boards (e.g., system board 50) that may include a plurality of circuits 52, 54, 56, 58, examples of which may include but are not limited to one or more microprocessors, memory circuits, voltage regulator circuits, and memory controller circuits.

IT device 10 may include one or more drive controller systems (e.g., drive controller system 60) that may be electrically coupled to system board 50. A mid-plane assembly (e.g., mid-plane assembly 62) may be electrically coupled to drive controller system 60. Mid-plane assembly 62 may include a plurality of drive connectors (e.g., drive connectors 100, 102, 104, 106, 108, 110, 112, 114, 116, 118, 120, 122, 124, 126, 128) that are configured to electrically couple mid-plane assembly 62 to a plurality of disk drives (e.g., disk drives 130, 132, 134, 136, 138, 140, 142, 144, 146, 148, 150, 152, 154, 156, 158, respectively), Disk drives 130, 132, 134, 136, 138, 140, 142, 144, 146, 148, 150, 152, 154, 156, 158 may be forward-facing and/or hot-swappable disk drives that may be coupled to and/or decoupled from mid-plane assembly 62 during the operation of IT device 10.

Additionally, disk drives 130, 132, 134, 136, 138, 140, 142, 144, 146, 148, 150, 152, 154, 156, 158 may include at least one 3.5" disk drive (e.g., 3.5" disk drives 130, 132, 134, 136, 138, 140, 142, 144, 146) electrically coupled to mid-plane assembly 62 and at least one 2.5" disk drive (e.g., 2.5" disk drives 148, 150, 152, 154, 156, 158) electrically coupled to mid-plane assembly 62. While in this particular example, mid-plane assembly 62 is shown to accommodate fifteen disk drives (e.g., nine 3.5" disk drives and six 2.5" disk drives), this is for illustrative purposes only, as the actual number of disk drives may be increased/decreased based upon design criteria and device height (e.g., 1U, 2U, 4U).

Examples of the 2.5" disk drives (e.g., 2.5" disk drives 148, 150, 152, 154, 156, 158) may include but are not limited to: PCI Express 2.5" disk drives (i.e., disk drives that interface with PCI Express bus 64 included within system board 50); and solid state, 2.5" disk drives (i.e., disk drives that utilize non-volatile solid state memory devices and do not utilize rotating platters and moving read/write heads). Additionally, examples of the 2.5" disk drives (e.g., 2.5" disk drives 148, 150, 152, 154, 156, 158) may include but are not limited to electro-mechanical disk drives that include platters and read/write heads (such as SAS drives and/or SATA drives).

Examples of the 3.5" disk drives (e.g., 3.5" disk drives 130, 132, 134, 136, 138, 140, 142, 144, 146) may include but are not limited to: SATA and/or SAS 3.5" disk drives (i.e., disk drives that are controlled via a SATA and/or SATA disk controller coupled to system board 50); and electromechanical, 3.5" disk drives (i.e., disk drives that utilize rotating platters and moving read/write heads).

As discussed above, IT device 10 may include one or more drive controller systems (e.g., drive controller system 60) that may be electrically coupled to system board 50. Drive controller system 60 may be configured to access and communicate with disk drives 130, 132, 134, 136, 138, 140, 142, 144, 146, 148, 150, 152, 154, 156, 158. Accordingly, if one or more of these disk drives is a SATA disk drive, all or a portion of drive controller system 60 may be a SATA disk controller system. Further, if one or more of these disk drives is a SAS disk drive, all or a portion of drive controller system 60 may be a SAS disk controller system. Alternatively, if one or more of these disk drives is a PCI Express disk drive, all or a portion of drive controller system 60 may be a PCI Express disk controller system.

IT device 10 may include an enclosure (e.g., enclosure 200) that is configured to house system board 50. Enclosure 200 may include: at least one native 2.5" drive bay (e.g., drive bays 202, 204, 206, 208, 210, 212) configured to house the at least one 2.5" disk drive, and at least one native 3.5" drive bay (e.g., drive bays 214, 216, 218, 220, 222, 224, 226, 228, 230) configured to house the at least one 3.5" disk drive.

The various disk drives (e.g., disk drives 130, 132, 134, 136, 138, 140, 142, 144, 146, 148, 150, 152, 154, 156, 158) included within IT device 10 may be configured as a tiered storage system. As is known in the art, a tiered storage system is a storage system that automatically moves data between groups of storage devices that have different levels of performance. For example and as is known in the art, solid state disk drives (e.g., 2.5" disk drives 148, 150, 152, 154, 156, 158) may be considerably quicker (e.g., concerning data access times and data transfer rates) than electromechanical disk drives (e.g., 3.5" disk drives 130, 132, 134, 136, 138, 140, 142, 144, 146). Accordingly, frequently used data (i.e., hot data) may be initially stored on solid state disk drives (e.g., 2.5" disk drives 148, 150, 152, 154, 156, 158), while less-frequently used data (i.e., cold data) may be initially stored on electromechanical disk drives (e.g., 3.5" disk drives 130, 132, 134, 136, 138, 140, 142, 144, 146). In the event that such hot data grows cold, the now cold data may be moved from the solid state disk drives to the electromechanical disk drives. Conversely, in the event that the cold data grows hot, the now hot data may be moved from the electromechanical disk drives to the solid state disk drives.

Having thus described the disclosure of the present application in detail and by reference to embodiments thereof, it will be apparent that modifications and variations are possible without departing from the scope of the disclosure defined in the appended claims.

What is claimed is:

1. An IT device comprising:
   a system board including at least one microprocessor;
   at least one 2.5" disk drive electrically coupled to the system board;
   at least one 3.5" disk drive electrically coupled to the system board; and
   an enclosure configured to house the system board and including:
       at least one native 2.5" drive bay configured to house the at least one 2.5" disk drive, and
       at least one native 3.5" drive bay configured to house the at least one 3.5" disk drive, wherein the at least one native 2.5" drive bay has a distinct orientation from the at least one native 3.5" drive bay.

2. The IT device of claim 1 wherein the at least one 2.5" disk drive includes at least one PCI Express 2.5" disk drive.

3. The IT device of claim 1 wherein the at least one 2.5" disk drive includes at least one solid state, 2.5" disk drive.

4. The IT device of claim 1 wherein the at least one 2.5" disk drive includes at least one forward-facing 2.5" disk drive.

5. The IT device of claim 4 wherein the at least one forward-facing 2.5" disk drive includes at least one hot-swappable, forward-facing 2.5" disk drive.

6. The IT device of claim 1 wherein the at least one 3.5" disk drive includes at least one SATA 3.5" disk drive and/or at least one SAS 3.5" disk drive.

7. The IT device of claim 1 wherein the at least one 3.5" disk drive includes at least one electromechanical 3.5" disk drive.

8. The IT device of claim 1 wherein the at least one 3.5" disk drive includes at least one forward-facing 3.5" disk drive.

9. The IT device of claim 8 wherein the at least one forward-facing 3.5" disk drive includes at least one hot-swappable, forward-facing 3.5" disk drive.

10. The IT device of claim 1 wherein the at least one 2.5" disk drive and the at least one 3.5" disk drive are configured as a tiered storage system.

11. The IT device of claim 1 wherein the IT device is configured for use in a high availability storage system.

12. An IT device comprising:
a system board including at least one microprocessor;
at least one solid state, PCI Express 2.5" disk drive electrically coupled to the system board;
at least one electromechanical 3.5" disk drive electrically coupled to the system board; and
an enclosure configured to house the system board and including:
at least one native 2.5" drive bay configured to house the at least one solid state, PCI Express 2.5" disk drive, and
at least one native 3.5" drive bay configured to house the at least one electromechanical 3.5" disk drive, wherein the at least one native 2.5" drive bay has a distinct orientation from the at least one native 3.5" drive bay.

13. The IT device of claim 12 wherein the at least one solid state, PCI Express 2.5" disk drive includes at least one forward-facing, solid state, PCI Express 2.5" disk drive.

14. The IT device of claim 13 wherein the at least one forward-facing, solid state, PCI Express 2.5" disk drive includes at least one hot-swappable, forward-facing, solid state, PCI Express 2.5" disk drive.

15. The IT device of claim 12 wherein the at least one electromechanical 3.5" disk drive includes at least one forward-facing, electromechanical 3.5" disk drive.

16. The IT device of claim 15 wherein the at least one forward-facing, electromechanical 3.5" disk drive includes at least one hot-swappable, forward-facing, electromechanical 3.5" disk drive.

17. The IT device of claim 12 wherein the at least one solid state, PCI Express 2.5" disk drive and the at least one electromechanical 3.5" disk drive are configured as a tiered storage system.

18. The IT device of claim 12 wherein the IT device is configured for use in a high availability storage system.

19. An IT device comprising:
a system board including at least one microprocessor;
at least one hot-swappable, solid state, PCI Express 2.5" disk drive electrically coupled to the system board;
at least one hot-swappable, electromechanical, 3.5" disk drive electrically coupled to the system board; and
an enclosure configured to house the system board and including:
at least one native 2.5" drive bay configured to house the at least one hot-swappable, solid state, PCI Express 2.5" disk drive, and
at least one native 3.5" drive bay configured to house the at least one hot-swappable, electromechanical, 3.5" disk drive, wherein the at least one native 2.5" drive bay has a distinct orientation from the at least one native 3.5" drive bay.

20. The IT device of claim 19 wherein the at least one hot-swappable, solid state, PCI Express 2.5" disk drive and the at least one hot-swappable, electromechanical, 3.5" disk drive are configured as a tiered storage system.

21. The IT device of claim 19 wherein the IT device is configured for use in a high availability storage system.

* * * * *